United States Patent [19]

Stadlmann

[11] Patent Number: 4,628,375
[45] Date of Patent: Dec. 9, 1986

[54] CONTROL SYSTEMS FOR MAGNETIC RECORDING TAPES

[75] Inventor: Wilfried Stadlmann, Butzbach, Fed. Rep. of Germany

[73] Assignee: Transamerica Delaval Inc., Lawrenceville, N.J.

[21] Appl. No.: 750,526

[22] Filed: Jun. 28, 1985

[51] Int. Cl.[4] .............................................. G11B 15/43
[52] U.S. Cl. ..................................................... 360/71
[58] Field of Search ........................ 360/71; 318/6, 7; 242/75.5, 75.51

[56] References Cited

U.S. PATENT DOCUMENTS

| | | | |
|---|---|---|---|
| 3,140,033 | 7/1964 | Zivny | 226/196 |
| 3,619,513 | 11/1971 | Morello et al. | 360/105 |
| 3,667,700 | 6/1972 | Carney et al. | 242/189 |
| 4,015,799 | 4/1977 | Koski et al. | 242/203 |
| 4,030,131 | 6/1977 | Beiter et al. | 360/71 |
| 4,051,415 | 9/1977 | Martin | 318/7 |
| 4,104,685 | 8/1978 | Chang | 360/84 |
| 4,156,257 | 5/1979 | Roberts | 360/71 |
| 4,157,488 | 6/1979 | Allan | 318/7 |
| 4,256,996 | 3/1981 | Brooks et al. | 318/7 |
| 4,347,538 | 8/1982 | Klank | 360/137 |
| 4,366,371 | 12/1982 | d'Alayer de Costemore d'Arc et al. | 377/18 |
| 4,398,227 | 8/1983 | Anderson | 360/71 |

FOREIGN PATENT DOCUMENTS 3306821 8/1984 Fed. Rep. of Germany.

OTHER PUBLICATIONS

Intel Microsystem Components Handbook, vol. I, Order No. 230843-001, 1981, AFN-01835C, pp. 2-10-2-25, 8085 AH, 8-Bit HMOS Microprocessors.
Intel, 1980, AFN-00221E, pp. 2-120-2-137, 8259A Programmable Interrupt Controller.
Intel, 1981, AFN-01960C, pp. 2-30-2-41, 8155H/8156H, 2048-Bit Static HMOS RAM with I/O Ports and Timer.
Intel Memory Components Handbook, Order No. 210830-003, 1983, Oct., AFN-01647A, pp. 4-32-4-35, Order No. 210570-003, 2764, 64k (8k×8) UV Erasable PROM.

Primary Examiner—George G. Stellar
Attorney, Agent, or Firm—Benoit Law Corporation

[57] ABSTRACT

Methods and apparatus for recording information with a magnetic recording head advance magnetic recording tape from a first rotating tape coil into a second rotating tape coil and assure constant head-to-tape contact with constant tape tension independently of variations in coil diameter and in tape velocity. There is determined or stored, for a series of diameter ratios between the first and second tape coils, a series of corresponding values of the first and second tape drive control signals for effecting advancement of the magnetic recording tape relative to the magnetic recording head with the first and second tape drives at constant head-to-tape contact with constant tape tension for all diameter ratios of that series. An electric third signal indicative of instantaneous diameter ratio between the first and second tape coils is provided in response to first and second tape coil tachometer signals. For each diameter ratio of that series, those of the corresponding values of the first and second control signals which effect advancement of the magnetic recording tape at constant head-to-tape contact with constant tape tension at the particular diameter ratio, are selected in response to the electric third signal, and the tape drives are continually controlled accordingly.

20 Claims, 2 Drawing Figures

CONTROL SYSTEMS FOR MAGNETIC RECORDING TAPES

BACKGROUND OF THE INVENTION

1. Field of the Invention

The subject invention relates to information recording and playback, to magnetic tape recording, to magnetic tape transports, to tape tension equalization, and to improvement of head-to-tape contact with constant tape tension independently of variations in coil diameter and in tape velocity.

2. Information Disclosure Statement

The following disclosure statement is made pursuant to the duty of disclosure imposed by law and formulated in 37 CFR 1.56 (a). No representation is hereby made that information thus disclosed in fact constitutes prior art, inasmuch as 37 CFR 1.56 (a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Magnetic tape transports are frequently used for data recording or storage, often in multiple tracks simultaneously. Especially in the field of instrumentation tape recording, but also in other areas, high precision of the tape motion and of other parameters are required to avoid time base errors and flutter. A great variety of prior proposals and systems are known, but have not been able to satisfy the needs met by the subject invention.

One approach drives the tape with as constant a speed as possible, effecting the reeling of the tape supply coil and the tape takeup coil at constant torque. However, that generally employed approach has the disadvantage that tape tension at the tape drive varies as a function of coil diameter. A constant tape tension in the region of the tape-head area is, however, a condition for unobjectionable data recording, since conditions, such as head-to-tape contact, tape elongation, synchronism and the like, vary especially in the area of multi track recording and playback heads with varying tape tension. Adverse consequences include objectionable output signal variations at the playback head due to varying head-to-tape contact, increased deviation from tape synchronism especially at the beginning and toward the end of the advanced tape, and increased static and dynamic time base errors at individual recording tracks through objectionable variations in elongation of the recording tape.

Tape transport with servocontrol of tape motion such as with the aid of mechanical sensors or pivoted equalizers, may approach constant tape advance, but only at a high technological effort. Such tape transports are primarily designed for large reel-to-reel systems, as may, for instance be seen from U.S. Pat. No. 3,140,033, by J. C. Zivny, issued July 7, 1964, for a pivoted magnetic tape tension equalizer, U.S. Pat. No. 3,667,700, by M. C. Carney et al, issued June 6, 1972 for a tape transport apparatus with loop formers in the tape path between the recording head and each reel, U.S. Pat. No. 4,030,131, by G. A. Beiter et al, issued June 14, 1977, for a slack tape loader with mechanical tension detectors operating in a tape drive servo system, and U.S. Pat. No. 4,104,685, by D. T. L. Chang, issued Aug. 1, 1978 for a tape transport having movable tension guides for controlling tape tension.

Often, such servo systems with mechanical tape sensors are too expensive or delicate and, in the case of tape cassettes, in which the tape is not accessible to mechanical sensor, not even practically realizable.

Apparently in an effort to overcome that drawback, there are some proposals to extract the tape from a tape cartridge, as may be seen from U.S. Pat. No. 3,619,513, by H. Morello et al, issued Nov. 9, 1971, for a retractable tape head structure with which the tape is applied to vacuum columns. That, of course, is also a very expensive approach requiring numerous electromechanical components.

A proposal addressed to a tape cassette environment is seen in U.S. Pat. No. 4,156,257, by S. L. Roberts, issued May 22, 1979, for a motor control circuit for a cassette tape drive unit.

That proposal records a speed signal in a control track, thereby utilizing space that could be employed for a further data track on the tape. Also, if head-to-tape contact is lost or becomes poor, operation with a recorded control signal obviously becomes impossible as well.

U.S. Pat. No. 4,051,415, by P. G. Martin, issued Sept. 27, 1977, for a web speed control systems, discloses use of a tachometer on each of the reel motors and employment of a reference source for adjusting drive power in a system which controls tape speed, rather than tension. Another speed control system is apparent from U.S. Pat. No. 4,157,488, by J. C. Allan, issued June 5, 1979, for methods and apparatus for controlling a tape drive to maintain a substantially constant linear tape velocity.

U.S. Pat. No. 4,398,227, by R. Anderson, issued Aug. 9, 1983, discloses a digital start/stop recorder for random access tape positioning, aiming for a predetermined amount of tape tension during initialization of the recorder, thereby realizing optimum startup conditions.

The proposal according to U.S. Pat. No. 4,015,799, by J. A. Koski et al, issued April 5, 1977, employs a type of system that requires a tape-driven tachometer, which militates against use of tape cassettes.

A proposal according to U.S. Pat. No. 4,347,538, by O. Klank, issued Aug. 31, 1982, provides methods and apparatus for measurement and indication of the position of a coiled material in tape form, with footage counter. U.S. Pat. No. 366,371, by S. M. d'Alayer de Costemore d'Arc et al, issued Dec. 28, 1982, discloses methods and apparatus for monitoring tape movement in tape cassettes, using tape position determination algorithms for determining absolute values of tape position as tape is driven from reel to reel using numerical constants stored in memory and periodically measured reel rotation speed ratios.

A capstanless magnetic tape transport system is disclosed in U.S. Pat. No. 4,256,996, by S. W. Brooks et al, issued Mar. 17, 1981, and proposing control of a supply motor to meter tape at a predetermined speed, rather than at constant tension and head-to-tape contact.

Accordingly, despite all of the above mentioned efforts, there persisted a need for relatively low-cost, high-precision tape drives where constant head-to-tape contact could be maintained with constant tape tension, without resort to mechanical sensors or large electromechanical apparatus, which is particularly vulnerable to vibration in land, sea and air vehicles, or in vibration testing environments.

SUMMARY OF THE INVENTION

It is a general object of this invention to overcome the disadvantages and to meet the needs expressed or implicit in the above Information Disclosure Statement or in other parts hereof.

It is a related object of this invention to provide improved tape transports.

It is a germane object of this invention to assure constant head-to-tape contact with constant tape tension independently of variations in coil diameter and, preferably, independently of tape velocity.

It is a related object of this invention to provide improved magnetic tape recording methods and apparatus wherein test data and other information are recorded at high quality and precision over the length of the tape, without resort to mechanical sensors and the like which would, for instance, militate against use of tape cassettes.

It is a germane object of this invention to provide minimum flutter and time base errors at optimum head-to-tape contact also within the first and the last quarter of the tape supply.

Other objects of the invention will become apparent in the further course of this disclosure.

From one aspect thereof, the subject invention resides in a method of recording information with a magnetic recording head on a magnetic recording tape reeled from a first rotating tape coil into a second rotating tape coil and, more specifically, resides in the improvement of assuring constant head-to-tape contact with constant tape tension independently of variations in coil diameter, and preferably independently of variations in tape velocity, comprising in combination the steps of providing a first tape drive for the first tape coil, providing a second tape drive for the second tape coil, providing a first control signal for controlling the first tape drive, providing a second control signal for controlling the second tape drive, determining for a series of diameter ratios between the first and second tape coils a series of corresponding values of said first and second control signals for effecting advancement of the magnetic recording tape relative to the magnetic recording head with said first and second tape drives at constant head-to-tape contact with constant tape tension for all diameter ratios of said series, providing first and second tachometer signals indicative of simultaneous rates of rotation of the first and second rotating tape coils, providing in response to said first and second tachometers signals an electric third signal indicative of instantaneous diameter ratio between the first and second tape coils, selecting for each diameter ratio of said series in response to said electric third signal those of said corresponding values of said first and second control signals effecting said advancement of the magnetic recording tape relative to the magnetic recording head at constant head-to-tape contact with constant tape tension at the particular diameter ratio, and controlling said first and second tape drives with the latter first and second control signals having values selected for each diameter ratio of said series for advancement of the magnetic recording tape at constant head-to-tape contact with constant tape tension.

From a related aspect thereof, the subject invention resides in apparatus for recording information with a magnetic recording head on a magnetic recording tape reeled from a first rotating tape coil into a second rotating tape coil and, more specifically, resides in the improvement of assuring constant head-to-tape contact with constant tape tension independently of variations in coil diameter, comprising in combination a first tape drive for the first tape coil, a second tape drive for the second tape coil, means connected to said first tape drive for controlling the first tape drive with a first control signal, means connected to said second tape drive for controlling the second tape drive with a second control signal, means for providing for a series of diameter ratios between the first and second tape coils a series of corresponding values of said first and second control signals for effecting advancement of the magnetic recording tape relative to the magnetic recording head with said first and second tape drives at constant head-to-tape contact with constant tape tension for all diameter ratios of said series, means for providing first and second tachometer signals indicative of simultaneous rates of rotation of the first and second rotating tape coils, means connected to said means for providing first and second tachometer signals for providing in response to said first and second tachometer signals an electric third signal indicative of instantaneous diameter ratio between the first and second tape coils, means connected to said means for providing an electric third signal and to said means for providing a series of corresponding values of said first and second control signals for selecting for each diameter ratio of said series in response to said electric third signal those of said corresponding values of said first and second control signals effecting said advancement of the magnetic recording tape relative to the magnetic recording head at constant head-to-tape contact with constant tape tension at the particular diameter ratio, and means connected to said selecting means and to said means for controlling the first tape drive and said means for controlling the second tape drive, for controlling said first and second tape drives with the latter first and second control signals having values selected for each diameter ratio of said series for advancement of the magnetic recording tape relative to the magnetic recording head at constant head-to-tape contact with constant tape tension.

The subject invention resides also in apparatus for recording information with a magnetic recording head on a magnetic recording tape encased in a cassette and reeled from a first rotating tape coil into a second rotating tape coil, and, more specifically, resides in the improvement of assuring constant head-to-tape contact with constant tape tension independently of variations in coil diameter, comprising in combination a first tape drive for the first tape coil, a second tape drive for the second tape coil, means for inserting said magnetic recording head into the cassette for said head-to-tape contact while maintaining said tape in said cassette, means connected to said first tape drive for controlling the first tape drive with a first control signal, means connected to said second tape drive for controlling the second tape drive with a second control signal, means for providing for a series of diameter ratios between the first and second tape coils a series of corresponding values of said first and second control signals for effecting advancement of the magnetic recording tape relative to the magnetic recording head with said first and second tape drives at constant head-to-tape contact with constant tape tension for all diameter ratios of said series, means for providing first and second tachometer signals indicative of simultaneous rates of rotation of the first and second rotating tape coils in said cassette, means connected to said means for providing first and second tachometer signals for providing in response to said first and second tachometer signals an electric third signal indicative of instantaneous diameter ratio between the first and second tape coils in said cassette, means connected to said means for providing an electric third signal and to said means for providing a series of corresponding values of said first and second control signals for selecting for each diameter ratio of said series in response to said electric third signal those of said corresponding values of said first and second control signals effecting said advancement of the magnetic recording tape relative to the magnetic recording head at constant head-to-tape contact with constant tape tension at the particular diameter ratio, and means connected to said selecting means and to said means for controlling the first tape drive and said means for controlling the second tape drive, for controlling said first and second tape drives with the latter first and second control signals having values selected for each diameter ratio of said series for advancement of the magnetic recording tape relative to the magnetic recording head in said cassette at constant head-to-tape contact with constant tape tension.

Other aspects of the invention will become apparent during the further course of this disclosure, and no restriction to any aspect, object or feature is intended by this Summary of the Invention.

BRIEF DESCRIPTION OF THE DRAWINGS

The subject invention and its various objects and aspects will become readily apparent from the following detailed description of preferred embodiments thereof, illustrated by way of example in the accompanying drawings, in which.

DESCRIPTION OF PREFERRED EMBODIMENTS

Figure 1:
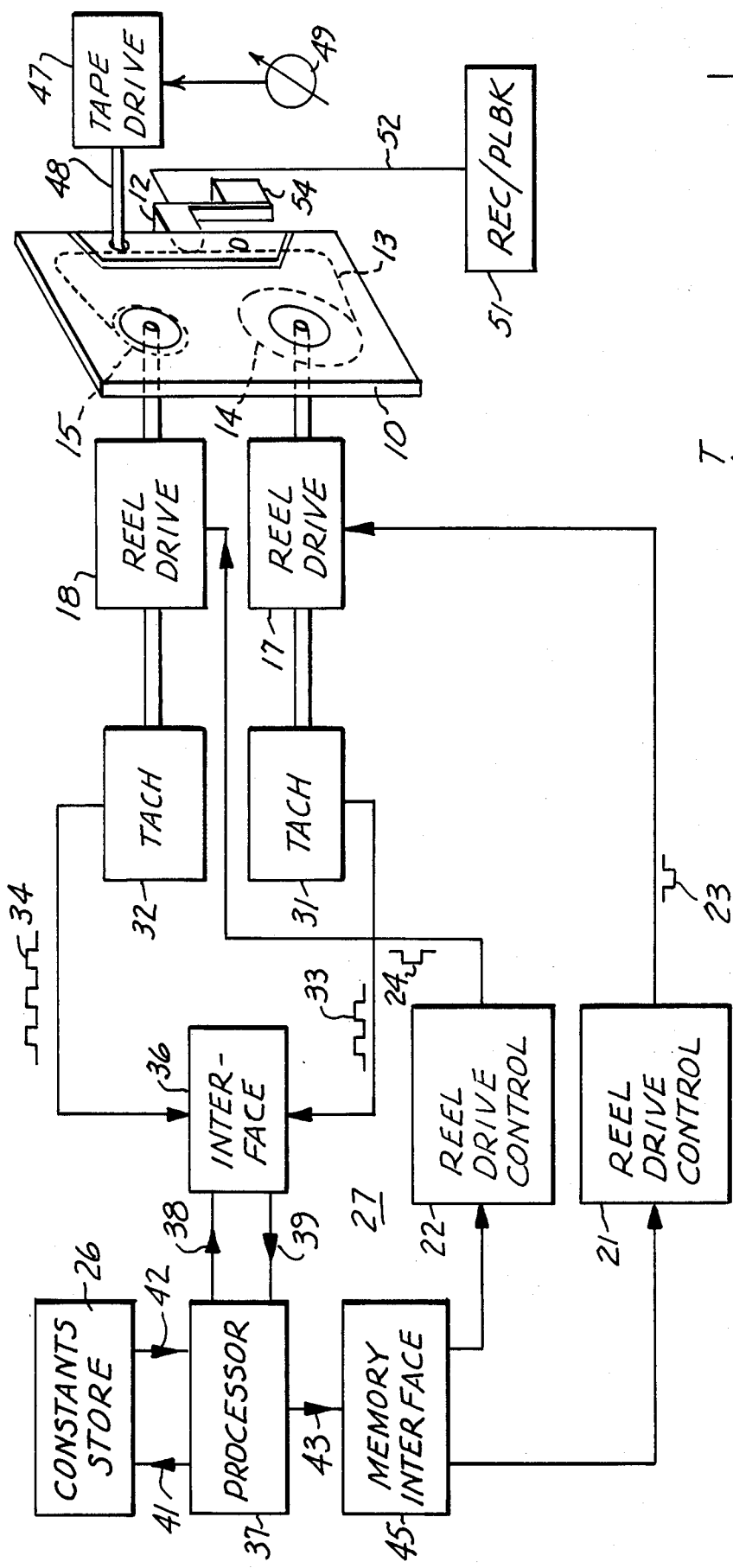
FIG. 1 is a block diagram of a control circuit, with tape drive and reel drive and a perspective showing of a standard tape cassette.

By way of background, FIG. 1 shows a standard tape cassette 10 in the context of apparatus for recording information with a magnetic recording head 12 on a magnetic recording tape 13 which is reeled from a first rotating tape coil 14 into a second rotating tape coil 15. The magnetic recording tape 13 is encased in the cassette 10 or in another cartridge where it is inaccessible to loop forming devices of the above mentioned or other constant tape tension systems. Unlike those above mentioned or other prior-art systems in which the tape is pulled out of the cassette or cartridge for recording, playback and other purposes, the tape 13 according to the illustrated embodiment of the invention remains inaccessible to loop forming devices during recording, playback, fast forward and tape rewind processes.

In principle, the subject invention may also be applied to open reel-to-reel and other tape drives. Accordingly, the first tape drive for the first tape coil 14 is shown as reel drive 17, while the second tape drive for the second tape coil 15 is shown as reel drive 18 in FIG. 1. Also, while the tape coil 14 may be the tape supply coil from which the tape is reeled into a second coil 15 at the tape takeup reel or side, these roles of coils 14 and 15 may, of course, be reversed in an bidirectional tape transport.

The reel drives 17 and 18 may comprise tape drive motors, which preferably are of a printed circuit or other low-inertia type.

First and second tape motor or reel drive controls 21 and 22 control the first and second tape or reel drives 17 and 18, respectively. In particular, the first reel drive control 21 is connected to the first tape drive 17 for controlling that first tape drive with a first control signal shown very symbolically at 23 in FIG. 1. Similarly, the second reel drive control 22 is connected to the second reel drive 18 for controlling that second tape drive with a second control signal shown also very symbolically at 24.

The components 17, 18, 21 and 22 may be considered as part of a tape drive servo control employing, however, none of the conventional loop formers or tape-engaging mechanical sensors.

Figure 2:
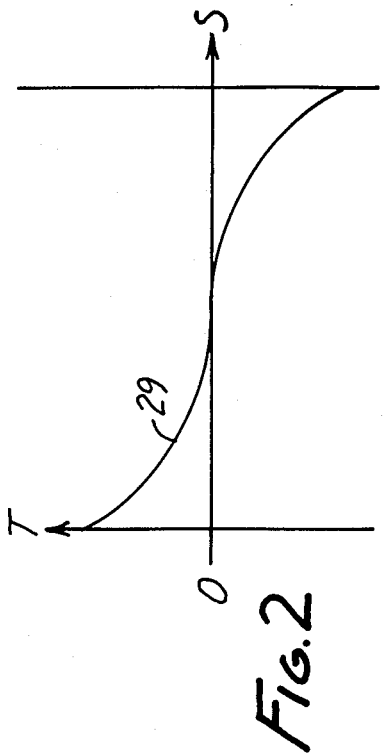
FIG. 2 is a graph of torque versus tape length; illustrating data useful in the operation of the control circuit of FIG. 1.

The subject invention determines for a series of diameter ratios between the first and second tape coils 14 and 15 a series of corresponding values of the first and second control signals 23 and 24 for effecting advancement of the magnetic recording tape 13 relative to the magnetic recording head 12 with the first and second tape drives 17 and 18 at constant head-to-tape contact with constant tape tension for all diameter ratios of that series. These control signal values, which may be determined mathematically or experimentally, are preferably stored in a constants store 26. In this respect, while FIG. 1 shows a block diagram of the tape drive and reeling control circuitry 27, it also illustrates the tape drive and reeling method according to the subject invention or its illustrated preferred embodiment. Accordingly, tape drive and reeling will first be described functionally, while a description of exemplary hardware in terms of commercially available circuit components is set forth toward the end of this description. As illustrated in FIG. 2, torque, T, as a function of tape length, s, for an advancement of the magnetic recording tape 13 over its tape length at constant tension may also be determined, such as in terms of gram-centimeters of torque versus meters of tape length measured from the beginning of the tape.

The mathematically or experimentally determined torque values are plotted in FIG. 2 in the form of a torque curve 29. In practice, the curve 27 is not typically symmetrical relative to the x and y axes, since factors, such as head-to-tape and internal tape friction impose a non-linearity in the torque curve 29. Accordingly, values representing that torque curve are preferably stored at 26 in the constants store, whereby corresponding values for the first and second control signals 23 and 24 are also selected with the aid of the determined torque as a function of tape length to effect the advancement of the magnetic recording tape 13 relative to the magnetic recording head 12 at constant head-to-tape contact with constant tape tension at the particular or each diameter ratio.

First and second tachometers 31 and 32 provide first and second tachometer signals, shown very symbolically at 33 and 34, which are indicative of simultaneous rates of rotation of the first and second rotating tape coils 14 and 15. The tachometers 31 and 32 are connected through interface 36 to a processor 37. As more fully discussed below, a microprocessor may be employed for that purpose.

In response to the first and second tachometer signals 33 and 34, and with the aid of the processor 37, as indicated by arrow 38, the interface 36, as indicated at 39, provides the processor with an electric third signal indicative of instantaneous diameter ratio between the first and second tape coils 14 and 15. The interface 36 thus provides the processor 37 with a specific third signal for each tape reel diameter ratio of the above mentioned series.

The processor 37, in turn, as indicated at 41 and 42, selects for each diameter ratio of that series, in response to the mentioned electric third signal, those of the above mentioned corresponding values of the first and second control signals which effect the advancement of the magnetic recording tape 13 relative to the magnetic recording head 12 at constant head-to-tape contact with constant tape tension at each particular diameter ratio occurring in the transport of the tape from one reel to the other. For this purpose, the series of corresponding values for the first and second control signals 23 and 24 are stored at 26, and the processor 37 retrieves from that stored series of corresponding values in response to the mentioned electric third signal those of these corresponding values for the first and second control signals 23 and 24 that effect the advancement of the magnetic recording tape 13 relative to the magnetic recording head at constant head-to-tape contact with constant tape tension at each particular diameter throughout the run of the tape.

Where the memory 26 also stores torque values, as indicated in FIG. 2, for instance, as a function of tape length for an advancement of the magnetic recording tape over its tape length at constant tension, the processor 37 also selects from that constants store the first and second control signals with the aid of the determined torque as a function of tape length to effect the advancement of the magnetic recording tape 13 relative to the magnetic recording head 12 at constant head-to-tape contact with constant tape tension at the particular diameter ratio.

The first and second tape drives 17 and 18 are thus controlled with the first and second control signals 23 and 24, the values of which are selected by the servo control circuitry 27 for each diameter ratio of the above mentioned series for advancement of the magnetic recording tape 13 at constant head-to-tape contact with constant tape tension.

Within the scope of the subject invention, the reel drives 17 and 18 thus may not only reel the tape 13 from one coil into the other, but may actually effect the advancement of that tape in contact with the head 12 as well. However, also within the scope of the subject invention, a separate tape drive 47 with capstan 48 is employed in the illustrated embodiment for driving the tape at the above mentioned constant head-to-tape contact with constant tape tension past the head 12. A high-precision, crystal-controlled tape drive may be employed for that purpose.

However, even with such a high-quality drive, there still would be objectionable flutter, time base errors, variations in tape elongation and other signal distorting effects, if tape tension at the tape drive varied as a function of coil diameter, especially in the first and last thirds of tape length, through conventional reeling at the tape supply and takeup. However, the subject invention overcomes that prior-art drawback in the case of a magnetic recording tape 13 being driven with a capstan 48, by maintaining, with the first and second control signals 23 and 24 produced in the above mentioned manner, the requisite constant head-to-tape contact with constant tape tension throughout the advancement of the magnetic recording tape with the tape capstan 48. In fact, this is even the case if the magnetic recording tape is advanced at different speeds.

In particular, FIG. 1 shows a tape drive with a variable speed control 49. Such speed controls are conventional and may permit deliberate variation of the tape speed either in an analog manner or in predetermined stages. For instance, an adjustable multispeed tape drive could be employed at 47 to 49. In any of these cases, the subject invention maintains, with the first and second control signals 23 and 24, the constant head-to-tape contact and constant tape tension for all of the different speeds of the tape 13. As disclosed above, the determined torque as a function of tape length, as illustrated with the aid of FIGS. 1 and 2, may be employed to assure or improve constant head-to-tape contact and tape tension.

Within the broad scope of the invention, certain tolerances may exist in practice in the constancy of the head-to-tape contact and tape tension. For instance, a substantial improvement of tape advance and other parameters is already realized if the accuracy of the torque function represented by the curve 29 or of the control with the circuitry 27 varies as much as five percent, especially if an accurate tape drive is employed at 47. In other words, there are practical recording and playback situations, in which a control of the tape reeling process according to the subject invention will still permit maintenance of a constant head-to-tape contact with constant tape tension at acceptable tolerances, even if the values of the produced control signals 23 and 24 vary within a few percent of the ideal values.

Also, the expressions magnetic recording, magnetic recording head and magnetic recording tape are intended to be broad enough to cover recording and playback processes as well. For instance, what has herein be termed magnetic recording head may in fact be a playback head, or a combined recording and playback head, or separate recording and playback heads may be employed at 12, as desired or necessary.

Information to be recorded typically is provided in the form of an electric signal that is amplified and processed by suitable electronic equipment 51, and is applied via leads 52 to the recording head 12. In the case of a playback of recorded information, the signal picked up by a playback head at 12 is applied via lead 52 to a playback amplifier and signal processor at 51.

By way of example, a PROM may be employed as or in the constants store 26. For instance, an Intel UV Erasable PROM Type 2764 may be employed at 26 for providing or storing, for a series of diameter ratios between the first and second tape coils 14 and 15 a series of corresponding values of the first and second control signals 23 and 24 for effecting advancement of the magnetic recording tape 13 relative to the magnetic recording head 12 with the first and second tape drives 17 and 18 at constant head-to-tape contact with constant tape tension for all diameter ratios of that series. For a description of that Intel PROM, reference may be had to pages 4-31 to 4-35 of the Memory Components Handbook, by Intel Corporation, dated October 1983. Values of torque 29 as a function of tape length for an advancement of the magnetic recording tape 13 over its tape length at constant tension may also be stored in the PROM at 26.

The interface 36 may include an Intel RAM Type 8155, such as the Static HMOS RAM With I/0 Ports and Timer Type 8155H, as, for instance, described on pages 2-30 to 2-41 of the Microsystem Components Handbook by Intel Corporation, Volume I (1981). The interface 36 is connected to the tachometers 31 and 32 for providing, in response to the first and second tachometer signals 33 and 34, an electric third signal indicative of instantaneous diameter ratio between the first and second tape coils 14 and 15. That latter signal may be applied to the processor 37, as shown at 39 in FIG. 1.

That component 37 may be a microprocessor, such as the Intel Type 8085AH described, for instance, on pages 2-10 to 2-25 of the Microsystem Components Handbook by Intel Corporation, Volume I (1981).

As indicated by the arrow 38 in FIG. 1, the microprocessor 37 may assist the interface 36 in continually calculating from the first and second tachometer signals 33 and 34 values for the electric third signal indicative of corresponding diameter ratios between the first and second tape coils 14 and 15. The microprocessor 37 may then select for each diameter ratio of that series, in response to the electric third signal, those of the corresponding values of the first and second control signals 23 and 24 effecting the advancement of the magnetic recording tape 13 relative to the magnetic recording head at constant head-to-tape contact with constant tape tension at the particular diameter ratio of the tape coils 14 and 15. In particular, the microprocessor at 37 may retrieve, from the series of corresponding values stored in the PROM at 26, in response to the electric third signal, those of the corresponding values of the first and second control signals 23 and 24 effecting the advancement of the magnetic recording tape 13 relative to the magnetic recording head 12 at constant head-to-tape contact with constant tape tension at the particular diameter ratio of tape coils 14 and 15. In the illustrated preferred embodiment, such retrieval of the corresponding values of first and second control signals from the series stored at 26 may be effected in response to the electric third signal calculated at 36 and 37.

The microprocessor 37 preferably selects the first and second control signals 23 and 24 also with the aid of the determined torque 29 as a function of tape length to effect the advancement of the magnetic recording tape 13 relative to the magnetic recording 12 at constant head-to-tape contact with constant tape tension at the particular tape coil diameter ratio.

The memory interface 45 may, for instance, include a Programmable Interrupt Controller, such as Intel Type 8259A, as described, for instance, on pages 2-120 to 2-137 of the Microsystem Components Handbook by Intel Corporation, Volume I (1981).

The memory interface 45, connected to the selecting means or microprocessor 37, and to the reel drive controls 21 and 22, may thus control the first and second tape drives 17 and 18 with the first and second control signals 23 and 24 having values selected for each diameter ratio of the above mentioned series for advancement of the magnetic recording tape 13 relative to the magnetic recording head 12 at constant head-to-tape contact with constant tape tension.

The reel drive controls 21 and 22 may include digital-to-analog converters driving constant current sources for driving the reel drives or motors 17 and 18 at constant torque.

In this respect, while the above disclosure repeatedly refers to corresponding values of the first and second control signals 23 and 24, it is to be understood that the values stored in the constants store 26 need, of course, not be the actual values applied to the reel drives 17 and 18, but may be corresponding values for these control signals 23 and 24.

A head mount 54 is shown in FIG. 1 for inserting the magnetic recording head 12 into the cassette 10 for constant head-to-tape contact while the tape 13 is maintained in the cassette 10. In practice, a stationary mount may be employed at 54, if the cassette 10 is inserted onto a tape deck in a manner so that its front end will slide over the head 12, while its reels are sliding into engagement with the shafts of the reel drives 17 and 18. Alternatively, a movable mount may be employed at 54 for sliding the head 12 selectively into and out of the front opening of the inserted cassette 10. As an important point of the presently disclosed aspect of the invention, the tape 13 need not be removed in any manner from the cassette 10 for achievement of the continuous constant contact with the head during active advance of the tape from one useful end to the other.

The subject invention meets all of its initially stated objectives. The constant head-to-tape tension provided in accordance with the subject invention cannot be realized with state of the art tape speed controls. Prototypes of the illustrated prepared embodiment of the invention are performing well in trucks and other vehicles, and aboard boats and aircraft subjected to vibrations of up to 1.5 g magnitude, without rupture of the constant head-to-tape contact provided by the subject invention.

The subject extensive disclosure will suggest or render apparent to those skilled in the art various modifications and variations within the spirit and scope of the invention and of equivalents thereof.

I claim:

1. In a method of recording information with a magnetic recording head on a magnetic recording tape reeled from a first rotating tape coil into a second rotating tape coil, the improvement of assuring constant head-to-tape contact with constant tape tension independently of variations in coil diameter, comprising in combination steps of:
   providing a first tape drive for the first tape coil;
   providing a second tape drive for the second tape coil;
   providing a first control signal for controlling the first tape drive;
   providing a second control signal for controlling the second tape drive;
   determining for a series of diameter ratios between the first and second tape coils a series of corresponding values of said first and second control signals for effecting advancement of the magnetic recording tape relative to the magnetic recording head with said first and second tape drives at constant head-to-tape contact with constant tape tension for all diameter ratios of said series;
   providing first and second tachometer signals indicative of simultaneous rates of rotation of the first and second rotating tape coils;
   providing in response to said first and second tachometers signals an electric third signal indicative of instantaneous diameter ratio between the first and second tape coils;

selecting for each diameter ratio of said series in response to said electric third signal those of said corresponding values of said first and second control signals effecting said advancement of the magnetic recording tape relative to the magnetic recording head at constant head-to-tape contact with constant tape tension at the particular diameter ratio; and controlling said first and second tape drives with the latter first and second control signals having values selected for each diameter ratio of said series for advancement of the magnetic recording tape at constant head-to-tape contact with constant tape tension.

2. A method as in claim 1, including the steps of:

storing said series of corresponding values of said first and second control signals;

retrieving from said stored series of corresponding values in response to said electric third signal those of said corresponding values of said first and second control signals effecting said advancement of the magnetic recording tape relative to the magnetic recording head at constant head-to-tape contact with constant tape tension at the particular diameter ratio; and controlling said first and second tape drives with said retrieved first and second control signals having values selected for each diameter ratio df said series for advancement of the magnetic recording tape relative to the magnetic recording head at constant head-to-tape contact with constant tape tension.

3. A method as in claim 2, including the steps of:

continually calculating from said first and second tachometer signals values for said electric third signal indicative of correspohding diameter ratios between the first and second tape coils; and effecting said retrieval of said corresponding values of the first and second control signals from said stored series in response to said calculated values of the electric third signal.

4. A method as in claim 1, including the steps of:

continually calculating from said first and second tachometer signals values for said electric third signal indicative of corresponding diameter ratios between the first and second tape coils; and effecting said selection of said corresponding values of said first and second control signals in response to said calculated values of the electric third signal.

5. A method as in claim 1, including the steps of:

determining torque as a function of tape length for an advancement of said magnetic recording tape over its tape length at constant tension; and selecting said first and second control signals also with the aid of said determined torque as a function of tape length to effect said advancement of the magnetic recording tape relative to the magnetic recording head at constant head-to-tape contact with constant tape tension at the particular diameter ratio.

6. A method as in claim 1, including the steps of:

advancing said magnetic recording tape at different speeds; and maintaining with said latter first and second control signals said constant head-to-tape contact with constant tape tension for all of said different speeds.

7. A method as in claim 1, including the steps of:

determining torque as a function of tape length for an advancement of said magnetic recording tape over its tape length at constant tension;

advancing said magnetic recording tape at different speeds; and maintaining with said latter first and second signals and with said determined torque as a function of tape length said constant head-to-tape contact with constant tape tension for all of said different speeds.

8. A method as in claim 1, including the steps of:

advancing said magnetic recording tape with a tape capstan; and maintaining with said latter first and second control signals said constant head-to-tape contact with constant tape tension throughout said advancement of said magnetic recording tape with said tape capstan.

9. A method as in claim 1, including the steps of:

encasing said magnetic recording tape in a cassette inaccessible to loop forming devices of constant tape tension systems; and advancing said magnetic recording tape in said cassette at said constant head-to-tape contact with constant tape tension while inaccessible to loop forming devices.

10. A method as in claim 9, including the steps of:

determining torque as a function of tape length for an advancement of said magnetic recording tape over its tape length at constant tension; and selecting said first and second control signals also with the aid of said determined torque as a function of tape length to effect said advancement of the magnetic recording tape in said cassette relative to the magnetic recording head at constant head-to-tape contact with constant tape tension at the particular diameter ratio.

11. In apparatus for recording information with a magnetic recording head on a magnetic recording tape reeled from a first rotating tape coil into a second rotating tape coil, the improvement of assuring constant head-to-tape contact with constant tape tension independently of variations in coil diameter, comprising in combination:

a first tape drive for the first tape coil;

a second tape drive for the second tape coil;

means connected to said first tape drive for controlling the first tape drive with a first control signal;

means connected to said second tape drive for controlling the second tape drive with a second control signal;

means for providing for a series of diameter ratios between the first and second tape coils a series of corresponding values of said first and second control signals for effecting advancement of the magnetic recording tape relative to the magnetic recording head with said first and second tape drives at constant head-to-tape contact with constant tape tension for all diameter ratios of said series;

means for providing first and second tachometer signals indicative of simultaneous rates of rotation of the first and second rotating tape coils;

means connected to said means for providing first and second tachometer signals for providing in response to said first and second tachometer signals an electric third signal indicative of instantaneous diameter ratio between the first and second tape coils;

means connected to said means for providing an electric third signal and to said means for providing a series of corresponding values of said first and second control signals for selecting for each diameter ratio of said series in response to said electric third signal those of said corresponding values of said first and second control signals effecting said advancement of the magnetic recording tape relative to the magnetic recording head at constant head-to-tape contact with constant tape tension at the particular diameter ratio; and means connected to said selecting means and to said means for controlling the first tape drive and said means for controlling the second tape drive, for controlling said first and second tape drives with the latter first and second control signals having values selected for each diameter ratio of said series for advancement of the magnetic recording tape relative to the magnetic recording head at constant head-to-tape contact with constant tape tension.

12. Apparatus as in claim 11, wherein:

said means for providing a series of corresponding values include means for storing said series of corresponding values of said first and second control signals, and means for retrieving from said stored series of corresponding values in response to said electric third signal those of said corresponding values of said first and second control signals effecting said advancement of the magnetic recording tape relative to the magnetic recording head at constant head-to-tape contact with constant tape tension at the particular diameter ratio; and said means for controlling said first and second tape drives include means for controlling said first and second tape drives with said retrieved first and second control signals having values selected for each diameter ratio of said series for advancement of the magnetic recording tape relative to the magnetic recording head at constant head-to-tape contact with constant tape tension.

13. Apparatus as in claim 12, wherein:

said means for providing an electric third signal include means for continually calculating from said first and second tachometer signals values for said electric third signal indicative of corresponding diameter ratios between the first and second tape coils; and said retrieving means include means for effecting said retrieval of said corresponding values of the first and second control signals from said stored series in response to said calculated values of the electric third signal.

14. Apparatus as in claim 11, wherein:

said means for providing an electric third signal include means for continually calculating from said first and second tachometer signals values for said electric third signal indicative of corresponding diameter ratios between the first and second tape coils; and said selecting means include means for effecting said selection of said corresponding values of said first and second control signals in response to said calculated values of the electric third signal.

15. Apparatus as in claim 11, including:

means for storing values of torque as a function of tape length for an advancement of said magnetic recording tape over its tape length at constant tension;

said selecting means including means for selecting said first and second control signals also with the aid of said torque values as a function of tape length to effect said advancement of the magnetic recording tape relative to the magnetic recording head at constant head-to-tape contact with constant tape tension at the particular diameter ratio.

16. Apparatus as in claim 11, including:

means for advancing said magnetic recording tape at different speeds;

said means for controlling the first and second tape drives and said means for providing said corresponding values including means for maintaining with said latter first and second control signals said constant head-to-tape contact with constant tape tension for all of said different speeds.

17. Apparatus as in claim 11, including:

means for storing values of torque as a function of tape length for advancement of said magnetic recording tape over its tape length at constant tension; and means for advancing said magnetic recording tape at different speeds;

said means for controlling the first and second tape drives and said means for providing said corresponding values including means for maintaining with said latter first and second signals and with said torque values as a function of tape length said constant head-to-tape contact with constant tape tension for all of said different speeds.

18. Apparatus as in claim 11, including:

a tape capstan and means for advancing said magnetic recording tape with said tape capstan;

said means for controlling the first and second tape drives and said means for providing said corresponding values including means for maintaining with said latter first and second control signals said constant head-to-tape contact with constant tape tension throughout said advancement of said magnetic recording tape with said tape capstan.

19. In apparatus for recording information with a magnetic recording head on a magnetic recording tape encased in a cassette and reeled from a first rotating tape coil into a second rotating tape coil, the improvement of assuring constant head-to-tape contact with constant tape tension independently of variations in coil diameter, comprising in combination:

a first tape drive for the first tape coil;

a second tape drive for the second tape coil;

means for inserting said magnetic recording head into the cassette for said head-to-tape contact while maintaining said tape in said cassette;

means connected to said first tape drive for controlling the first tape drive with a first control signal;

means connected to said second tape drive for controlling the second tape drive with a second control signal;

means for providing for a series of diameter ratios between the first and second tape coils a series of corresponding values of said first and second control signals for effecting advancement of the magnetic recording tape relative to the magnetic recording head with said first and second tape drives at constant head-to-tape contact with constant tape tension for all diameter ratios of said series;

means for providing first and second tachometer signals indicative of simultaneous rates of rotation of the first and second rotating tape coils in said cassette;

means connected to said means for providing first and second tachometer signals for providing in response to said first and second tachometer signals an electric third signal indicative of instantaneous diameter ratio between the first and second tape coils in said cassette;

means connected to said means for providing an electric third signal and to said means for providing a series of corresponding values of said first and second control signals for selecting for each diameter ratio of said series in response to said electric third signal those of said corresponding values of said first and second control signals effecting said advancement of the magnetic recording tape relative to the magnetic recording head at constant head-to-tape contact with constant tape tension at the particular diameter ratio; and means connected to said selecting means and to said means for controlling the first tape drive and said means for controlling the second tape drive, for controlling said first and second tape drives with the latter first and second control signals having values selected for each diameter ratio of said series for advancement of the magnetic recording tape relative to the magnetic recording head in said cassette at constant head-to-tape contact with constant tape tension.

20. Apparatus as in claim 19, including:

means for storing values of torque as a function of tape length for an advancement of said magnetic recording tape over its tape length at constant tension; and means for advancing said magnetic recording tape at different speeds;

said means for controlling the first and second tape drives and said means for providing said corresponding values including means for maintaining with said latter first and second signals and with said torque values as a function of tape length said constant head-to-tape contact with constant tape tension for all of said different speeds.

* * * * *